United States Patent

[11] 3,613,916

| [72] | Inventor | Bernard Bradbury<br>Chico, Calif. |
|---|---|---|
| [21] | Appl. No. | 886,520 |
| [22] | Filed | Dec. 19, 1969 |
| [45] | Patented | Oct. 19, 1971 |
| [73] | Assignee | Rex Chainbelt Inc.<br>Milwaukee, Wis. |

[54] LUGGAGE CARRIER UNLOADER
8 Claims, 5 Drawing Figs.
[52] U.S. Cl.................................................. 214/62 A,
104/168, 105/241 C, 105/274
[51] Int. Cl............................................................. B61d 9/14
[50] Field of Search........................................... 214/61, 62,
62 A; 104/163, 168; 105/241 C, 274

[56] References Cited
UNITED STATES PATENTS

| 3,167,192 | 1/1965 | Harrison et al............... | 214/62 A |
| 3,510,014 | 5/1970 | Speaker et al................ | 214/62 A |

*Primary Examiner*—Robert G. Sheridan
*Attorney*—Marshall & Yeasting

ABSTRACT: A mechanism for unloading individual open top cars of a baggage-transporting system comprises an unloading station having a series of power-driven rollers arranged to engage and support a longitudinally extending member of the car frame about which the car pivots as the car moves through the station. The car tips as cam followers extending laterally from the car engage cam tracks mounted along the path of the car. A plurality of cam tracks may be provided to tip the car at selected discharge points and hold the car in tipped position during the remainder of its travel through the unloading station.

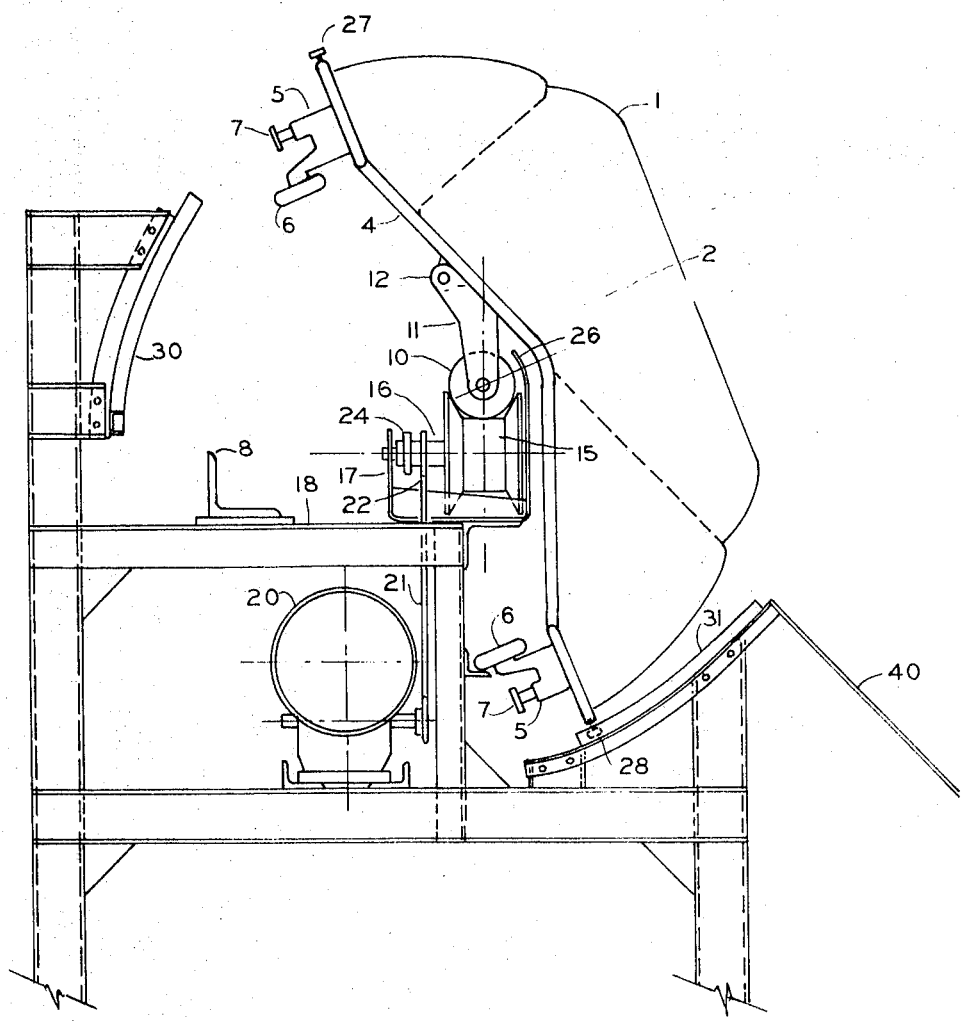
FIG. NO. 1
INVENTOR.
BERNARD BRADBURY

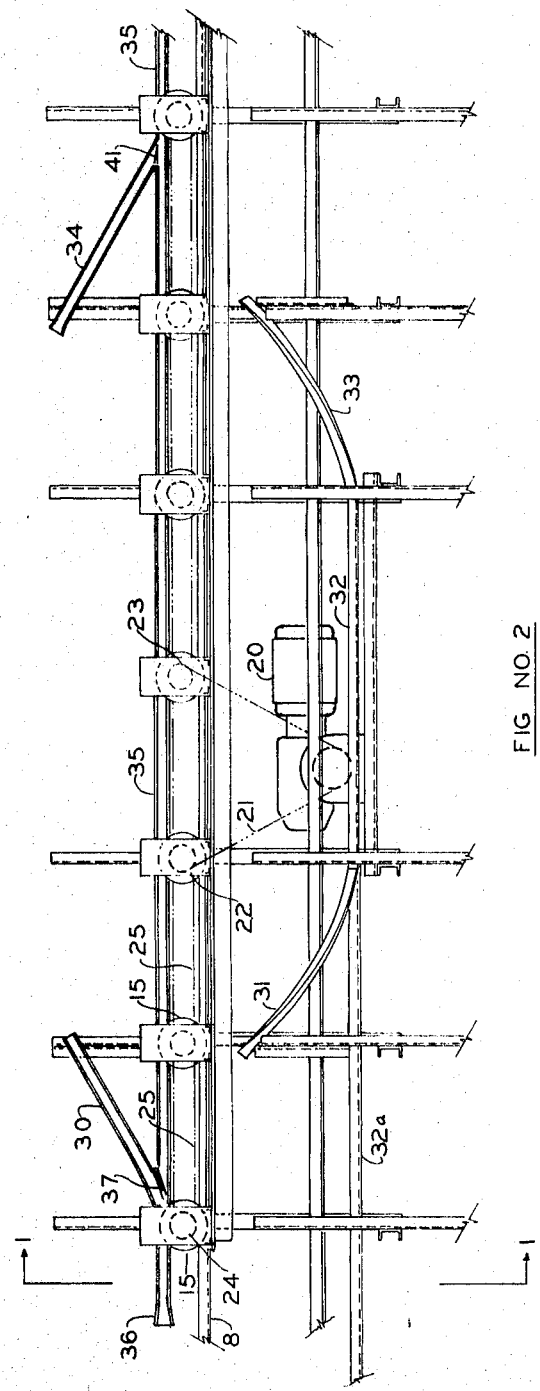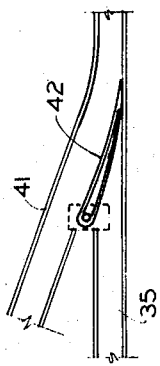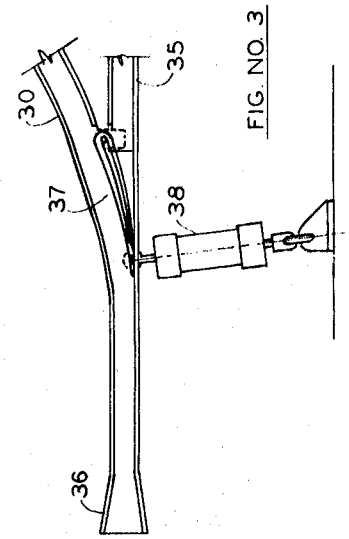

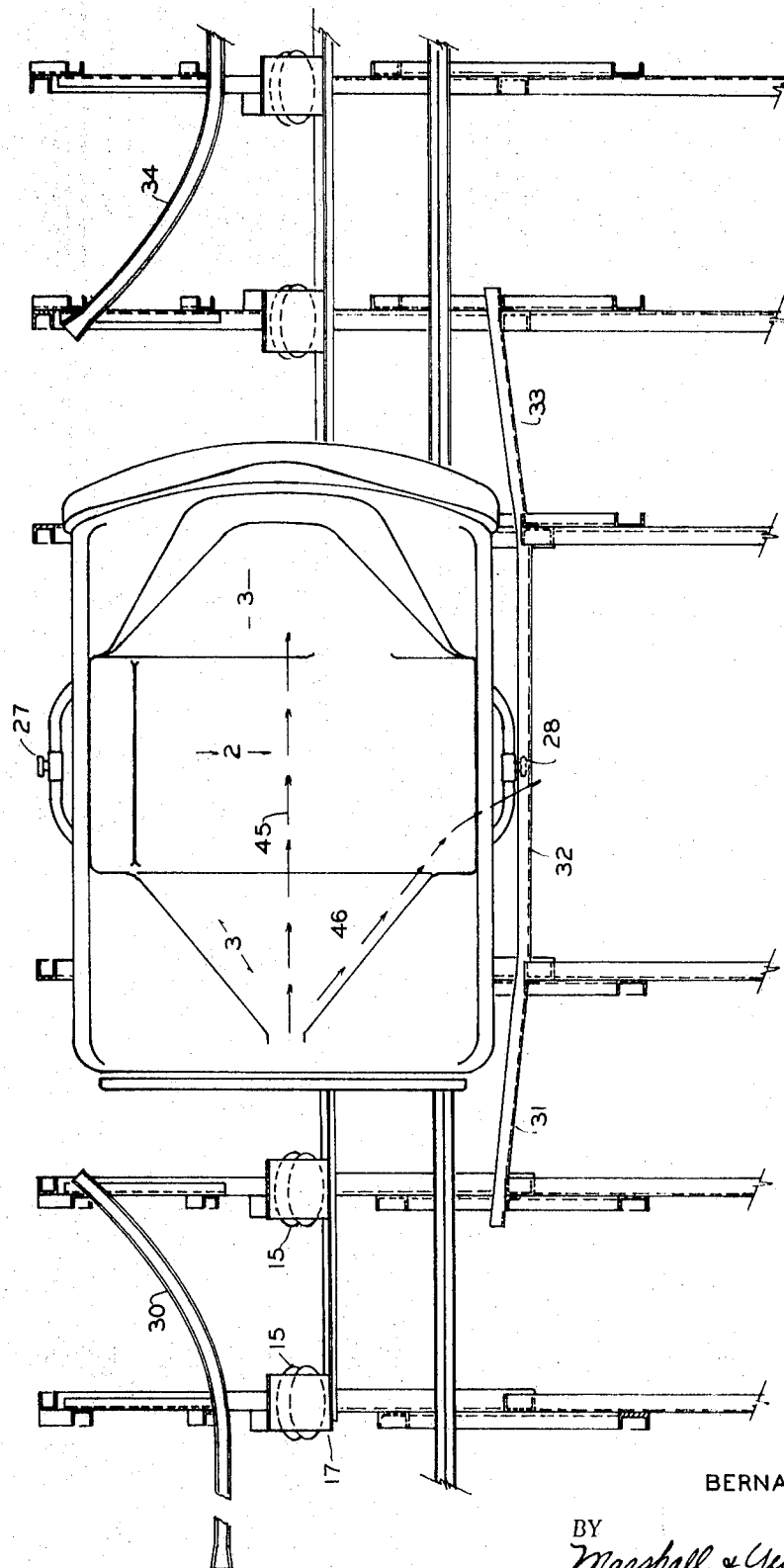

3,613,916

LUGGAGE CARRIER UNLOADER

SUMMARY OF THE INVENTION

In busy airports the transportation of passenger's baggage from check-in points to plane-loading areas and from plane-unloading areas to baggage claim areas is a problem. Large aircraft and close scheduling require that the large quantities of baggage be handled in relatively short periods of time. This invention relates to structure for automatically unloading individual baggage carriers at particular stations as they pass through the plane-loading area or through a baggage claim area. The unloading is accomplished by tipping the car about a longitudinal axis midway between and slightly above its track-engaging wheels while the car is supported and driven by flanged power-driven rollers engaging a longitudinally extending member mounted in the car for rotation about the pivot axis. A pair of cam followers extending laterally from the car engage selected stationary cam tracks to control the tipping of the car as it passes through the unloading station.

The principal object of the invention is to provide mechanism for unloading individual baggage carriers as they travel through an unloading zone.

Another object is to provide mechanism to tip a baggage car about a longitudinal axis located generally midway between the sides of the car.

A still further object is to provide a structure for tipping a baggage carrier with a minimum of lateral displacement of its center of gravity for discharging its contents at selected locations in an unloading zone.

These and more specific objects and advantages are provided by a preferred form of the invention illustrated in the accompanying drawings.

BRIEF DESCRIPTION OF THE DRAWINGS

In the drawings:

FIG. 1 is a vertical section of the unloading station as seen from the left end of FIG. 2.

FIG. 2 is a side elevation of an unloading station.

FIG. 3 is a detail of a cam track selector switch used at the approach to each station of an unloading area.

FIG. 4 is a detail of a merging switch as used at the exit of each of the intermediate unloading stations and at the exit end of the unloading area.

FIG. 5 is a view of the baggage car and track structure in the unloading zone of the system as seen facing the top of a tipped car.

DESCRIPTION OF THE PREFERRED EMBODIMENT

In its preferred form, the unloading mechanism, according to the invention is adapted to operate with individual baggage carriers or cars having a particular configuration. A baggage carrier, as shown in end elevation in FIG. 1, comprises a molded fiberglass body 1 having a centrally located recess 2, see also FIG. 5, adapted to receive ordinary pieces of baggage. The top surface of the car body 1 is further contoured to provide a longitudinally extending pocket 3, spanning the recess 2, to receive golf club bags and duffel bags that are too long to be placed transversely of the car in the central pocket 2.

The fiberglass body 1 is carried on a frame 4 having a pair of downwardly extending brackets 5 equipped with load-supporting wheels 6 and guide rollers 7. The wheels 6 are adapted to run on spaced angle iron tracks 8, only one of which is continued through the unloading area since the other would interfere with tipping of the car.

The car is further provided with a longitudinally extending rotatable reaction tube 10 that is journaled in stub shafts of a pair of arms 11 pivotally attached to the frame 4 of the car on pivot pins 12. By means not shown, the tube ends of the arms 11 are resiliently urged away from the frame 4 through a short distance, limited by stops, so that the reaction tube 10 may cooperate with power-driven rollers located along the trackway and set at angles with respect to the trackway according to the speed at which the car is to be driven along that particular section of the trackway.

When traveling through the unloading zone, as seen in FIGS. 1, 2 and 5, the reaction tube 10 is carried on flanged rollers 15 located along the pathway of the car at intervals slightly less than half the length of the reaction tube 10. The flanged rollers 15 are fixed on shafts 16 journaled in brackets 17 mounted on a supporting framework 18. The rollers are driven by a gear motor 20 mounted below the trackway and connected through a drive chain 21 trained over sprockets 22 and 23 mounted on the shafts 16 of adjacent rollers 15 near the center of the series of rollers in the unloading zone. The remaining rollers are driven from the two centrally located rollers by a series of sprockets and drive chains 24 and 25, each set of sprockets and connecting drive chains connecting one roller to its neighbor whereby all of the rollers are driven at the same speed.

As illustrated, all of the rollers 15 are power driven. As a modification alternate rollers of the series may be power driven.

As an alternative to the series of individual sprockets and drive chains, each of the flanged rollers 15 may be provided with a groove intermediate the flanges that contains sprocket teeth and that is deep enough so that a chain may run on the sprocket teeth below and just out of contact with the reaction tube 10 of a car being carried on the rollers. In this modification a single chain may be employed since the weight of the chain is sufficient to maintain engagement of the chain on the sprocket to drive an idle roller and the weight of the car supported on its reaction tube 10 would be sufficient to prevent any disengagement of the chain from the sprocket teeth when driving the car. This alternative arrangement offers the additional advantage that should the load in the car be nonsymmetrical lengthwise of the car so that the car on the reaction tube 10 tends to teeter on a roller before the leading end of the reaction tube engages the next roller, the chain limits any substantial teetering motion and insures that the reaction tube 10 properly engages the next roller.

As an additional safety measure, two parallel chains may be employed, the two parallel chains being located in grooves adjacent the flanges of the roller 15 so as to form a cradle to prevent any lateral displacement of the reaction tube 10 should it tend to teeter and twist on one of the rollers.

Each of the brackets 17 includes an upwardly extending portion 26 curved to overhang the right-hand flange of the roller 15, FIG. 1, as well as a portion of the reaction tube 10 to prevent any possibility of the reaction tube 10 jumping out of the space between the flanges toward the right.

Each car is further provided with laterally extending pins carrying cam followers 27 and 28 which cooperate with a system of cam tracks to tip the car as it travels through the unloading station. These cam tracks include a tip-initiating cam track 30, a tip-completion cam track 31, a tip-holding track 32, a return initiating track 33 and a return completion or merging track 34, as well as a no-tipping guide track 35.

Referring to FIG. 2, as a car approaches the unloading station its left-hand cam follower 27 enters the flared entrance portion 36 of the straight-through guide track 35. If the car is to be passed through this unloading area without dumping, an entrance switch 37 in left in the straight-through position, the alternative to the position shown in FIG. 3, so that the left-hand cam follower 27 follows along the cam track 35 holding the car in a level condition as it is carried along on the rollers 15.

In the event the car is to be dumped, the entrance switch 37 is positioned in its lower position by an air cylinder 38, as shown in FIG. 3, so that the cam follower 27 is guided into the tip-initiating cam track 30 thus starting the rotation of the car about its longitudinal axis, i.e. the reaction tube 10, as the car moves into the unloading area. After the car has been tipped approximately 30° its left cam follower 27 leaves the track 30 and its right-hand cam follower 28 enters the tip completion track 31 which in turn tips the car an additional 35° to 40° to the fully tipped position as illustrated in FIG. 1 by the time the car reaches the tip-holding cam track 32. As the car approaches its fully tipped position any baggage in the car slides down the now inclined face of the pocket 2 and onto a sloped receiving deck 40.

After tipping, the car continues to run in the tipped condition to the end of the unloading area at which time the right-hand cam follower 28 enters the return initiating track 33, shown near the right end of FIG. 2, causing the car to return toward its level condition. After returning about halfway, the left-hand cam follower 27 enters the return completion track 34 while the right-hand cam follower leaves the end of the track 33. Continued travel of the car brings the cam follower 27 down through a merging switch 41 (illustrated in FIG. 4) leading into the straight-through cam track 35. Near the end of the unloading area, after the car has been returned to its level condition, the right-hand one of the tracks 8 is resumed so that the car then leaves the support of the flanged rollers 15 and drops back to its normal operation with its wheels 6 running on the tracks 8. The straight-through cam track 35 terminates at this point since it is no longer necessary.

The car-tipping cam tracks are divided, part on one side of the car and part on the other to avoid interference between baggage in a car and an overhead track or obstruction of the path of the baggage moving off the car.

The unloading mechanism according to the invention makes it possible to have a plurality of stations in the unloading area and to selectively tip the car to discharge its contents in any one of the stations. To do this a plurality of switches, such as the switch 37 are provided, one for each such unloading station and corresponding tip-initiating cam tracks 30 and tip-completion tracks 31 are provided for each one of the stations. Likewise, an extension 32a of the tip-holding cam track 32 is provided from the first such station through to the last such station in the unloading zone. A merging switch such as the switch 41 is provided where each of the tip-completion cam tracks merges with the tipped or tip-holding track 32a.

While the drawing shows an unloading station or unloading area provided with a straight-through cam track 35 so that a car may if desired be passed completely through the unloading station without dumping its load it may be desirable under certain circumstances that any loaded car approaching the last station in the unloading area be unloaded at that point to remove all possibility that, through an error in the selection mechanism, a car might take its load out of the unloading area. In this arrangement, the last station which would tip and unload any previously untipped car, would be considered an emergency station and any luggage discharged at that point would be immediately examined and routed to its proper destination.

It may be noted in the design of the switches, as shown in FIG. 3 and FIG. 4, that the movable element has a curved upper surface providing an accelerating zone to direct the cam follower into the diverging track with a minimum of shock to the parts of the car. In the merging switch, as shown in FIG. 4, no positive actuating mechanism is used but rather the cam follower on the car moves the movable member to its upper position when approaching on the straight-through tracks such as the track 35 or the tipped position track 32a.

FIG. 5 shows the car in relationship to the tracks 30, 31, 32, 33 and 34, the track 35 being omitted, as it appears when looking directly at the upper surface of a tipped car.

FIG. 5 also illustrates the path of an article of baggage or luggage leaving the car as it is being dumped. As the car moves along, following the path indicated by the arrows 45, it is tipped with the motion starting when the car is at the entrance to the unloading station, shown at the extreme left end in FIG. 5. At this time the luggage and the car are following the same or parallel paths such as the path indicated by the arrows 45 and the path indicated by the arrows 46 representing the path of the luggage. As the car is tipped and passes the transfer point when the cam follower 27 leaves the tip-initiating track 30 and the follower 28 engages the track 31 the maximum tipping velocity is achieved and from that point on the car-tipping motion decelerates. However, the luggage in the car having reached the full tipping velocity because of its location above the tipping axis moves relative to the car as indicated by the arrows 46 so that when the car reaches its fully tipped position, as shown in FIG. 5, the luggage has moved to the edge of the car and is ready to slide across the gap and onto the inclined receiving deck 40.

Because of the accuracy of the motion of the car enforced by the cam tracks it has been found that the trajectory or path of the luggage leaving the car body 1 and sliding down the inclined receiving deck 40 is highly predictable and that the system is capable of accurately delivering the luggage to any of a number of selected receiving stations in the unloading area.

I claim:

1. Apparatus for conveying and discharging articles at selected stations spaced along a path, comprising a car assembly that includes a cam follower extending from one side of the car and a longitudinally extending member positioned generally midway between the sides of the car, and a stationary discharger station comprising a series of aligned roller guides adapted to cooperate with the longitudinally extending member to support the car during its travel through the station, and a tipping cam track fixed with respect to said roller guides and cooperating with said cam follower for tipping said car about said longitudinally extending member to an article discharging attitude as the car passes through said discharge station.

2. Apparatus for conveying and discharging articles according to claim 1 having a second cam follower mounted on a side of the car opposite the first cam follower, and a second cam track fixed with respect to said roller guides to cooperate with the second follower, said second follower and cam track serving to complete a tipping motion initiated by said first follower and cam track.

3. In an apparatus according to claim 1, pivot means journaling the longitudinally extending member in the car for rotation about its longitudinal axis.

4. An apparatus according to claim 3 in which the longitudinally extending member is cylindrical.

5. In an apparatus according to claim 1, power means connected to said series of aligned roller guides for rotating said roller guides to drive the car through the station.

6. In an apparatus according to claim 1, a straight cam track cooperating with the laterally extending follower for guiding a car through the station in a nondischarging attitude and switch means mounted at the entrance to said station and cooperating with the straight cam track and the tipping cam track for selectively guiding the cam follower into said tracks.

7. An apparatus for conveying articles to and discharging the articles at selected stations, comprising a plurality of stations according to claim 6 and a terminal station, said straight cam track terminating at the entrance to said terminal station and a tipping cam track leading from said straight cam track into said terminal station, whereby any car passing said plurality of stations in nondischarge attitude is tipped and unloaded in said terminal station.

8. An apparatus according to claim 1 having an inclined table adjacent the path of the tipped car and oriented to receive articles discharged from the car.